July 5, 1966   J. B. BLACK ETAL   3,259,218
POWER TRANSMISSION
Filed March 25, 1963   5 Sheets-Sheet 1

Inventors.
James B. Black.
James J. Jameson.
Joseph B. Snoy.
By.

July 5, 1966

J. B. BLACK ETAL 3,259,218

POWER TRANSMISSION

Filed March 25, 1963

Inventors.
James B. Black.
James J. Jameson.
Joseph B. Snoy.

By John W Darley
Attorney.

United States Patent Office 3,259,218
Patented July 5, 1966

1

3,259,218
POWER TRANSMISSION
James B. Black, James J. Jameson, and Joseph B. Snoy, Rockford, Ill., assignors to Twin Disc Clutch Company, Racine, Wis., a corporation of Wisconsin
Filed Mar. 25, 1963, Ser. No. 267,402
7 Claims. (Cl. 192—3.5)

Our invention relates to power transmissions and more particularly to an arrangement incorporating a facility for direct and hydraulic torque converter drives in conjunction with a multirange, power shift gear box.

The transmission is intended for use with vehicles generally including over the highway and cross country types, the converter providing torque multiplication under stated conditions and a lockup clutch providing for direct drive. It is known that, in the operation of a vehicle, there are many long periods when torque multiplication is not required and, during such times, the converter stator freewheels and the lockup clutch ties the converter impeller and turbine together for direct drive.

Torque multiplication is normally important in initiating movement of the vehicles from a position of rest, whether forwardly or rearwardly, and in moving the vehicle under difficult terrain conditions, but at other times, it may be desirable to operate in direct drive. Further, when such a converter-lockup clutch structure is employed in connection with a power shift, multi-range gear box, such as, for example, the five forward and reverse gear box shown, it is desirable to exercise positive and precise, releasing control on the engaged lockup clutch during gear shifts for the purpose of insuring smooth, split second shifts in the gear box and of utilizing the converter as a shock damper during each such shift.

Further, with increasing weights of vehicles and their loads, adequate braking capacity is becoming a serious problem and, generally speaking, such capacity is presently limited by the available brake space at the vehicle wheels. In the present instance, this problem is met by incorporating in the overall package an hydraulic retarding device which is additive to the usual wheel brakes and saves undue wear thereof.

It is therefore one object of the invention to provide a transmission of the character indicated which is restricted to converter drive in first and reverse gears and the shift in higher gear from converter to direct drive and vice versa is effected at a determined speed of the converter turbine shaft, the shift to direct drive occurring at a higher turbine shaft speed than the shift from direct to converter drive.

A further object is to devise a transmission as set forth in which provision is made for automatically releasing the lockup cltuch, if then engaged, whenever a shift in the gear box is made between any gears higher than first gear.

A further object is the incorporation in the transmission of an hydraulic retarding device for providing additional and controllable braking capacity and wherein the device is included in the hydraulic system comprising the converter and associated regulating and valving controls.

Figure 1:
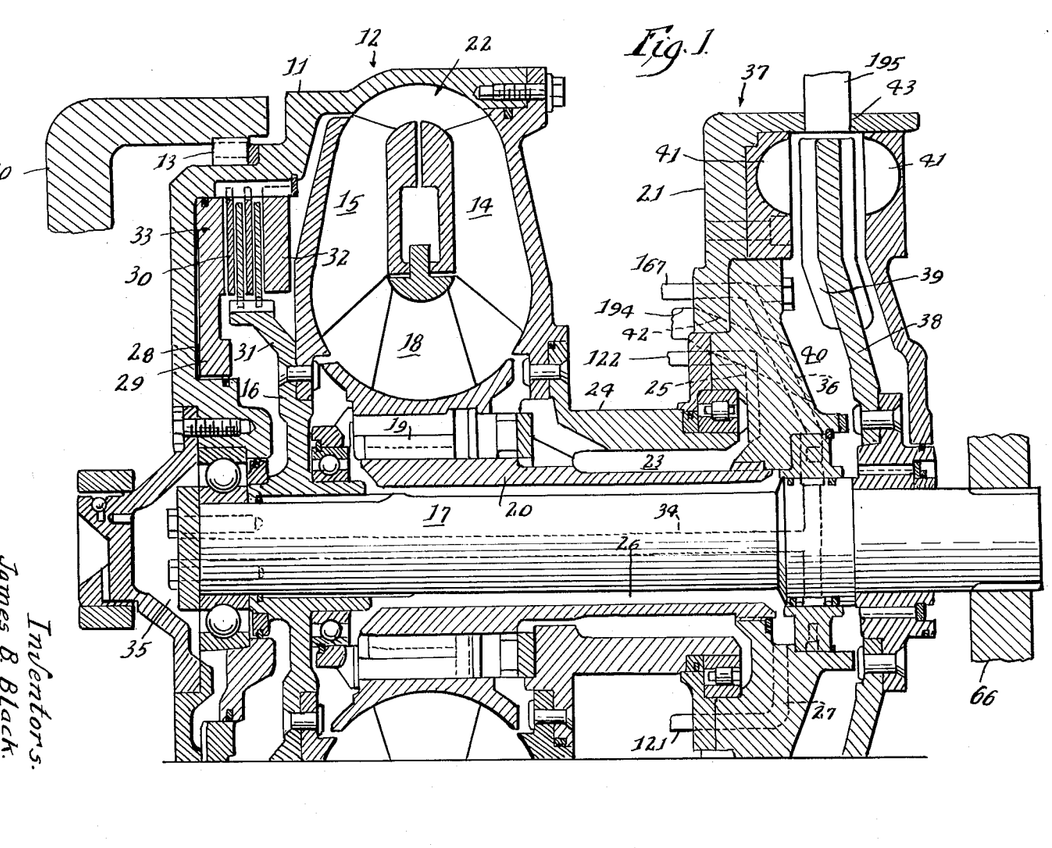
FIG. 1 is a fragmentary, sectional elevation showing the general relation of the converter, lockup clutch and retarder, the lockup clutch being released.

Referring to FIG. 1, the numeral 10 designates a driving ring suitably connected to an engine flywheel or otherwise connected to an engine output constituting a power source (not shown). The ring 10 has driving connection with the rotary housing 11 of an hydraulic torque converter 12 through a plurality of teeth 13 and the converter 12 includes an outward flow impeller 14 carried by the housing 11, an inward flow turbine 15 carried by a ring 16 that is keyed or splinedly connected to a turbine shaft 17, and an inwardly positioned stator 18 that is connected through a conventional overrunning clutch 19 to a stationary sleeve 20 concentric with the shaft 17 and forming part of a stationary housing 21.

The impeller 14, turbine 15 and stator 18 are related to provide a conventional toroidal circuit 22 to which the working liquid, usually a suitable oil and so referred to hereinafter, is discharged from the inlet of the impeller 14 through an annular passage 23 included between the stationary sleeve 20 and a concentric extension sleeve 24 forming a part of the converter housing 11, the passage 23 communicating through a passage 25 in the housing 21 with a pipe presently described. Oil is supplied to the toroidal circuit 22 adjacent the outlet of the turbine 15 through an annular passage 26 included between the shaft 17 and stationary sleeve 20, the passage 26 communicating through a passage 27 in the stationary housing 21 with a pipe presently described.

For the purpose of locking the impeller 14 and turbine together to establish direct drive, the forward part of the rotary housing 11 is recessed to provide an annular cylinder 28 in which is reciprocable an annular piston 29 that is operably related to a clutch plate stack 30 whose alternate plates have driven relation to the rotary housing 11 and whose intervening plates have driving relation to an annular, toothed extension 31 of the ring 16. When hydraulically actuated as presently described, the piston 29 clamps the plates of the clutch stack 30 against an abutment ring 32 which is suitably held against axial movement and has driven engagement with the rotary housing 11. The driving connection so established between the housing 11 and ring 16 will hereinafter be referred to as a lockup clutch 33. Oil pressure for the clutch 33 is supplied through a passage 34 in the shaft 17, one end of this passage communicating through passage means 35 generally included between the housing 11 and the shaft 17 and the other end of the passage 34 connects through a passage 36 in the stationary housing 21 with a pipe presently identified.

So far as described, the transmission is generally conventional in that when in converter drive, the stator 18 is held against rotation by the overrunning clutch 19 and when in direct drive, lockup clutch 33 engaged, the impeller 14 and turbine 15 rotate together as a unit and the stator 18 rotates freely in the toroidal circuit 22 as permitted by the release of the overrunning clutch 19.

Still referring to FIG. 1, the braking capacity of the vehicle is increased by a hydraulically controlled retarder 37 which is selectively utilizable in either converter or direct drive. The retarder 37 includes a disk rotor 38 which at all times is driven by the turbine shaft 17 and carries on opposite sides thereof a plurality of generally radially positioned radial blades 39. The rotor 38 operates in a chamber 40 provided in the housing 21 and its outer portion functions between annular, oppositely facing, bladed stators 41—41 located around the outer portion of the chamber 40. When not in use, the chamber 40 is empty and is conditioned for braking by oil supplied through a passage 42 in the housing 21 and such oil is discharged through an outlet 43 provided in the periphery of the housing 21 under suitable control as presently described.

The foregoing structure is included in a hydraulic system which includes a number of controls for respectively limiting the transmission to operate in converter drive when the gear box is in first or reverse gear, determining in any forward gear above first gear an automatic shift from converter to direct drive when the speed of the turbine shaft attains a determined value and including an automatic return to converter drive when the turbine shaft speed drops to another and lower determined value, a selection of a desired gear in the gear box, an automatic shift from direct to converter drive whenever a gear change is made in the gear box in the range of second to fifth gears, and a capacity for controlled hydraulic braking in either converter or direct drive. These facilities are schematically shown in the hydraulic system shown in FIG. 2 wherein the transmission is conditioned for converter drive in first gear and to which reference will now be made.

Figure 2:
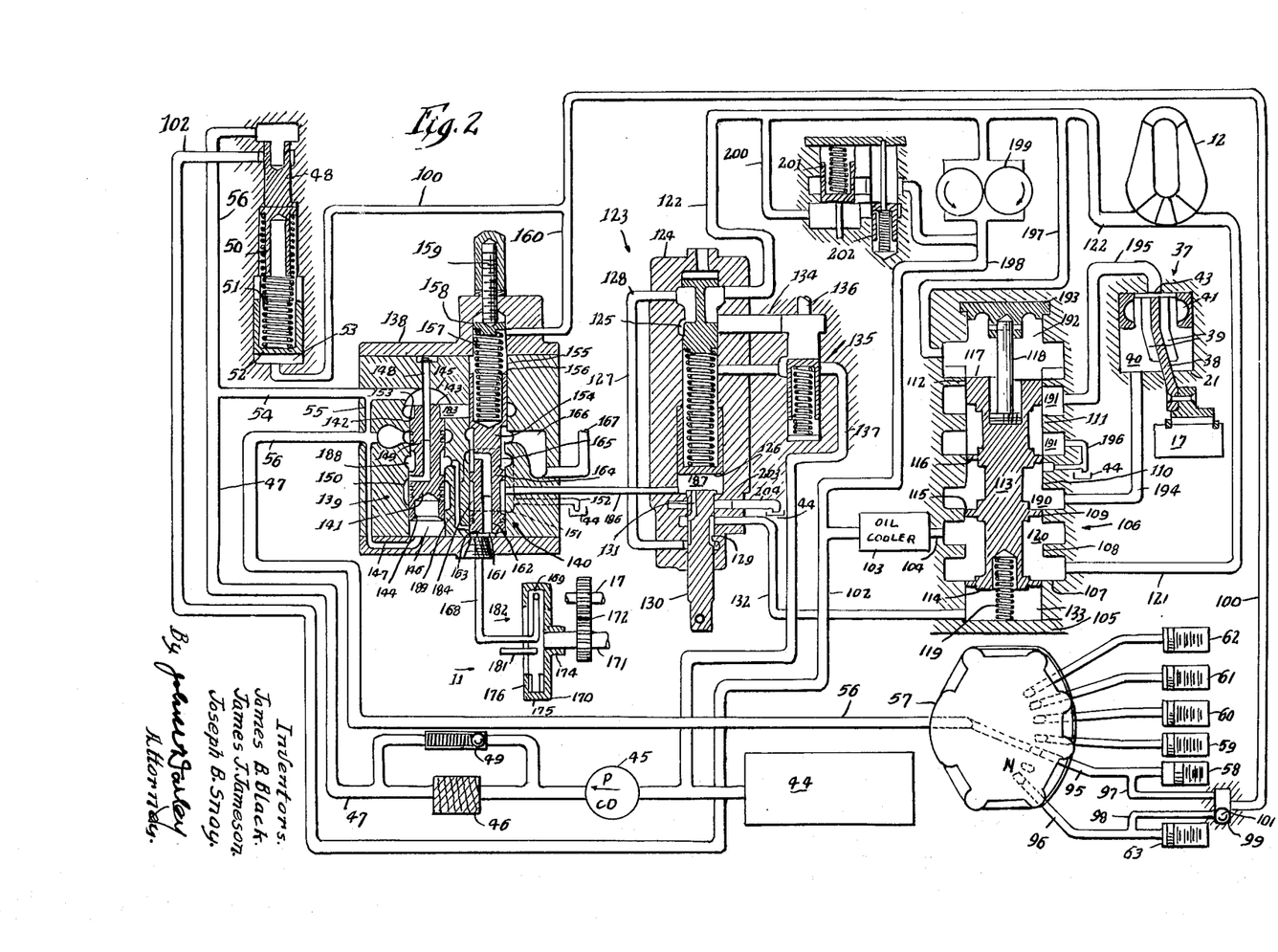
FIG. 2 is a schematic view showing the hydraulic circuit which links the parts shown in FIG. 1 and the hydraulically actuated cltuches of the gear box, the latter being in first gear, power flow being through the converter, and the retarder being out of operation.

The oil is drawn from a convenient sump 44 by a suitably driven, positive displacement, charging pump 45 for delivery successively through a filter 46 and a pipe 47 to the head of a pressure regulating valve 48 which determines the apply pressure of the several clutches including the lockup clutch and the clutches in the gear box as presently described. A spring loaded check valve 49 may be bridge around the filter 46 to insure oil flow when the filter is clogged or under cold oil conditions. A follower 50 bears constantly against the valve 48 by reason of the thrust of one end of a spring 51 whose opposite end bears against a piston 52. As shown in FIG. 2, the piston 52 is displaced from the base 53 by a pressure presently identified to thereby effect a higher loading on the spring 51 and hence a higher pressure in the pipe 47 as established by the regulating valve 48. This higher pressure in the pipe 47 occurs only in converter drive when the gear box is in first or reverse gear and the means for accomplishing this higher pressure will be presently set forth Anteriorly of the head of the regulating valve 48, the pipe 47 connects through a pipe 54 and an orifice passage 55 with a pipe 56 leading to a conventional, gear range, selector valve 57 for selectively determining the engagement of oil pressure actuated, friction plate clutches 58, 59, 60, 61 and 62 that respectively determine the operation of the first to fifth gears in the gear box. The selector valve 57 is also conditioned in one position to supply oil pressure to an oil actuated, friction plate clutch 63 for determining reverse gear in the gear box and the neutral position of the selector valve 57 is denoted by the letter "N," the selector valve in the latter position dead heading the oil supply.

Referring to FIGS. 5 to 10, inclusive, there is schematically shown, and for convenience in separated relation, the several clutches in the gear box and their connection to the several gear components, the arrows in each of these figures indicating the direction of power flow. Common to each of the gear trains in FIGS. 5 to 10, inclusive, is an input shaft 64 carrying on one end a coupling member 65 arranged for driven connection with a similar member 66 (see FIG. 1) splined to the turbine shaft 17 and adjacent the other end of the input shaft 64, the latter carries gears 67, 68 and 69 of appropriate pitch diameters as are all of the gears presently mentioned. The input shaft 64 has suitable pilot relation with the end of an axially aligned, load shaft 70 which carries adjacent its output end a gear 71.

First gear (FIG. 5) is determined by engagement of the clutch 58 which is carried on countershaft means 72 which additionally supports gears 73 and 74 that respectively mesh with gears 68 and 71. For second gear (FIG. 6), the clutch 59 is engaged and it and gears 75 and 76 are carried by countershaft means 77, the gears 75 and 76 respectively meshing with gears 67 and 71. For third gear (FIG. 7), the clutch 60 is engaged and it and gears 78 and 79 are carried on countershaft means 80, the gears 78 and 79 meshing respectively with gears 69 and 71. For fourth gear (FIG. 8), the clutch 61 is engaged and the load shaft 70 additionally carries a gear 81 that meshes with a gear 82 supported by countershaft means 83 that also carries the clutch 61 and a gear 84 meshing with the gear 67. For fifth gear (FIG. 9), the clutch 62 is engaged and it along with the gears 85 and 86, which respectively mesh with the gears 81 and 69, are carried on countershaft means 87. For reverse gear (FIG. 10), the clutch 63 is engaged and it along with gears 88 and 89 are carried on countershaft means 90, the gear 89 meshing with the gear 68. Related to the output shaft 70 and countershaft means 90 and shown in exploded relation thereto is a conventional idler shaft 91 which carries gears 92 and 93 that mesh, respectively, with gears 71 and 88, the latter meshing being schematically indicated by dotted lines.

As noted above, FIGS. 5 to 10, inclusive, are intended to only schematically show the power flow through the gear box, now generally designated by the numeral 94, in the several gears which is sufficient for present purposes since the internal construction of the gear box 94 apart from that shown in FIGS. 5 to 10, inclusive, is not important to the disclosure. Actually, and in accordance with conventional practice, the six clutches shown in FIGS. 5 to 10, inclusive, may be grouped in three sets of dual clutches, such as, for example, first and reverse gear clutches, second and fourth gear clutches, and third and fifth gear clutches, this grouping reducing the countershafts to three. Conventional means (not shown) are employed to provide for connection to the sump 44 of those gear box clutches 58 to 63, inclusive, which are disengaged at any time.

Associated with the first and reverse gear clutches 58 and 63, respectively (see FIG. 2), are systemic means for insuring that higher pressure will be applied to the latter clutches relative to the other clutches in the gear box 94. Specifically, the supply pipes 95 and 96 which connect the selector valve 57 to the clutches 58 and 63 are tapped by pipes 97 and 98, all respectively, that lead to a two position, check valve generally designated by the numeral 99. The outlet of the valve 99 connects by a pipe 100 with the base 53 so that when pressure is present in the pipe 100, it acts against the piston 52.

With the selector valve 57 in the first gear position shown in FIG. 2, the check valve ball 101 masks the outlet of the pipe 98 so that the engaging pressure for the clutch 58 is additionally delivered through the pipe 100 to the head of the piston 52 whose diameter is larger than that of the regulating valve 48. The spring 51 is accordingly shortened so that the valve 48 regulates at its maximum design pressure. When the selector valve 57 is moved to determine engagement of the reverse gear clutch 63, the ball 101 masks the outlet of the pipe 97 and the same, relatively higher engaging pressure is regulated by the valve 48 with respect to the reverse gear clutch 63. In all other gear box clutch positions of the selector valve 57, the piston 52 rests on the base 53 and the somewhat lower engaging pressure for the clutches 59 to 62, inclusive, is determined by the spring 51.

Since in the first gear position shown in FIG. 2, power flow is only through the converter 12, the relation thereof to the hydraulic system so far as described will now be set forth.

Pressure oil relieved by the regulating valve 48 moves successively through a pipe 102, an oil cooler 103 and a pipe 104 to the elongated casing 105 of a retarder valve 106 that is additionally associated with the retarder 37 in the manner hereinafter described. The casing 105 includes annular shoulders 107, 108, 109, 110, 111 and 112 spaced longitudinally thereof and slidable in the casing 105 is a valve stem 113 having annular lands 114, 115, 116 and 117 longitudinally spaced therealong and having guiding and substantial sealing relation to some of the above indicated shoulders in the two positions of the valve stem 113. One of these positions is shown in FIG. 2 wherein the retarder valve 106 acts as part of the passage leading to the converter 12 and additionally serves to exhaust any oil in the retarder 37 as presently described.

Considering the FIG. 2 position of the retarder valve stem 113 wherein it is biased in its up position, as viewed in said figure, against a stop pin 118 by a spring 119 interposed between the casing 105 and the lower end of the valve stem 113, the lands 114, 115, 116 and 117 contact respectively the shoulders 107, 109, 110 and 112 and then included between the lands 114 and 115, the shoulders 107, 108 and 109, and the valve stem 113 is an annular chamber 120. The latter chamber provides the only connection between the pipe 104 and a pipe 121 leading to the passage 27 (see FIG. 1) and thence to the toroidal circuit 22 of the converter 12. The discharge from the toroidal circuit 22 is successively through the passages 23 and 25 (see FIG. 1) and thence through a pipe 122 to a regulating valve 123 for determining the toroidal circuit working pressure in the converter 12.

The valve 123 includes a casing 124 within which are movable aligned regulating and follower pistons 125 and 126, respectively, with a spring 127 interposed therebetween. Pressure oil is delivered to the head of the regulating piston 125 and thence successively through a pipe 128, an annular channel 129 provided in a manually controlled stem 130, that is aligned with the piston 126 and is slidable in the lower end of the casing 124, and a passage 131 in the stem 130 to the lower end of the follower piston 126. In all positions of the stem 130, the channel 129 and passage 131 are in communication. Since the diameter of the follower piston 126 is greater than that of the regulating piston 125, the piston 126 will occupy the raised position shown in FIG. 2, thus loading the spring 127 and establishing through the pipe 122 the maximum design pressure in the toroidal circuit 22. This pressure is that which obtains in the toroidal circuit 22 during drive through the converter 12. As shown in FIG. 2, the regulating valve 123 which determines the working oil pressure in the toroidal circuit 22 during converter drive is in back pressure relation to the regulating valve 48 which determines the apply pressure to the several clutches so that the latter pressure is always higher than the converter working pressure.

In the FIG. 2 position of the regulating valve 123, the pressure oil in the annular channel 129 is also active through a pipe 132 leading to a variable volume chamber 133 then included between the casing 105, shoulder 107 and land 114, thus assisting the spring 119 in maintaining the up or converter connecting position of the stem 113.

Oil relieved by the regulating valve 123 passes through a pipe 134 to a conventional pressure regulating valve generally designated by the numeral 135 for regulating the oil pressure through the pipe 136 in the usual lubricating system (not shown) of the transmission. When the latter pressure is established, the valve 135 opens to deliver the excess oil through a pipe 137 to the suction side of the pump 45.

Still considering the converter drive conditioning of the transmission with the gear box 94 in first gear as shown in FIG. 2, there will now be described the valve structure which insures during first or reverse gear that all power flow will be through the converter 12.

Referring to FIG. 2, the numeral 138 designates a casing which may include the throttling passage 55 and its connections with the pipes 54 and 56 and additionally houses kickdown and lockup valves 139 and 140, respectively. Each of these valves includes a presently identified piston having two positions. For convenience in referring to the drawings, these positions will be termed "up" and "down" with the understanding that these pistons otherwise are not restricted to vertical movements. The same consideration applies to the movements of the retarder valve stem 113.

The kickdown valve 139 includes a piston 41 that is reciprocable in a cylinder 142 and is shown in its normal operating position, i.e., the position which it assumes between shifts in the gear box 94 and which is one of its two positions. For convenience, the opposite ends of the kickdown piston 141 will be regarded as upper and lower ends 143 and 144, respectively, as they appear in FIGS. 2 and 3. The upper end 143 is constantly exposed to pressure in the chamber 145 as supplied by the pipe 54 and the lower end 144 is constantly exposed to pressure in the chamber 146 as supplied by a passage 147 which connects with the pipe 56 and hence with the throttling passage 55. A fixed pin 148 has one end mounted in the casing 138 and its opposite end extends within a passage 149 which extends partly longitudinally and partly laterally through the kickdown piston 141 for constant communication with an annular passage 150 recessed in the casing 138 around the kickdown piston 141. The passage 150 constantly communicates through a chamber 151, shown dotted in FIGS. 2 and 3, and a passage 152 with the sump 44 so that the pasasge 149 is always at atmospheric pressure.

Due to the fixed pin 148, the area of the upper end 143 is smaller than that of the lower end 144 so that in the operating condition shown in FIG. 2, first gear clutch 58 engaged, the throttling passage 55 is not effective to restrict oil flow and the differences in the total pressures acting against the upper and lower ends 143 and 144, respectively, maintain the kickdown piston 141 in the up position shown in FIG. 2 and against a shoulder 153 provided in the casing 138. If the selector valve 57 is shifted to reverse gear position, the cylinder of the first gear clutch 58 is dumped by conventional means (not shown) and pressure oil begins flowing to the cylinder of the reverse gear clutch 63. This oil flow upsets the pressure relation which hitherto maintained the kickdown piston 141 in the FIG. 2 position since the restriction exercised by the throttling passage 55 establishes a higher pressure in the pipe 54 relative to that in the pipe 56 so that the the kickdown piston 141 is moved to its other or down position. The latter position is maintained until the cylinder of the reverse gear clutch 63 is fully supplied with pressure oil and then the orifice passage 55 loses control, pressures become stabilized in the chambers 145 and 146 and the kickdown piston 141 is returned as explained above to the up position shown in FIG. 2.

The kickdown valve 139 operates in the above manner whenever the selector valve 57 is actuated to determine a shift in the gear box 94, but its operation has special value in relation to the lockup valve 140 in that whenever the lockup clutch 33 (see FIG. 1) is engaged, a shift in the gear box 94 automatically shifts the lockup valve 140 to the lockup clutch release position shown in FIG. 2.

Referring to FIG. 2, the lockup valve 140 includes a piston 154 that is reciprocable in a cylinder 155 and is shown in the down position which it occupies during first and reverse gear conditions of the gear box 94 and also when a shift is made between any of the gears above first gear as subsequently described.

The upper end of the lockup valve piston 154, as viewed in FIG. 2, is counterbored to provide a skirt 156 in which is received one end of a loading spring 157 whose opposite end abuts a follower 158 and pressure on the spring 157 may be regulated by an adjusting screw 159. Additional loading for the lockup valve piston 154, but only during first and reverse gear drive, is provided by oil pressure delivered through a pipe 160 which at one end connects with the pipe 100 between the base 53 and the check valve 99 and at the opposite end connects with the skirt 156 or upper end of the lockup valve piston 154 and below the follower 158.

Figures 3, 4:
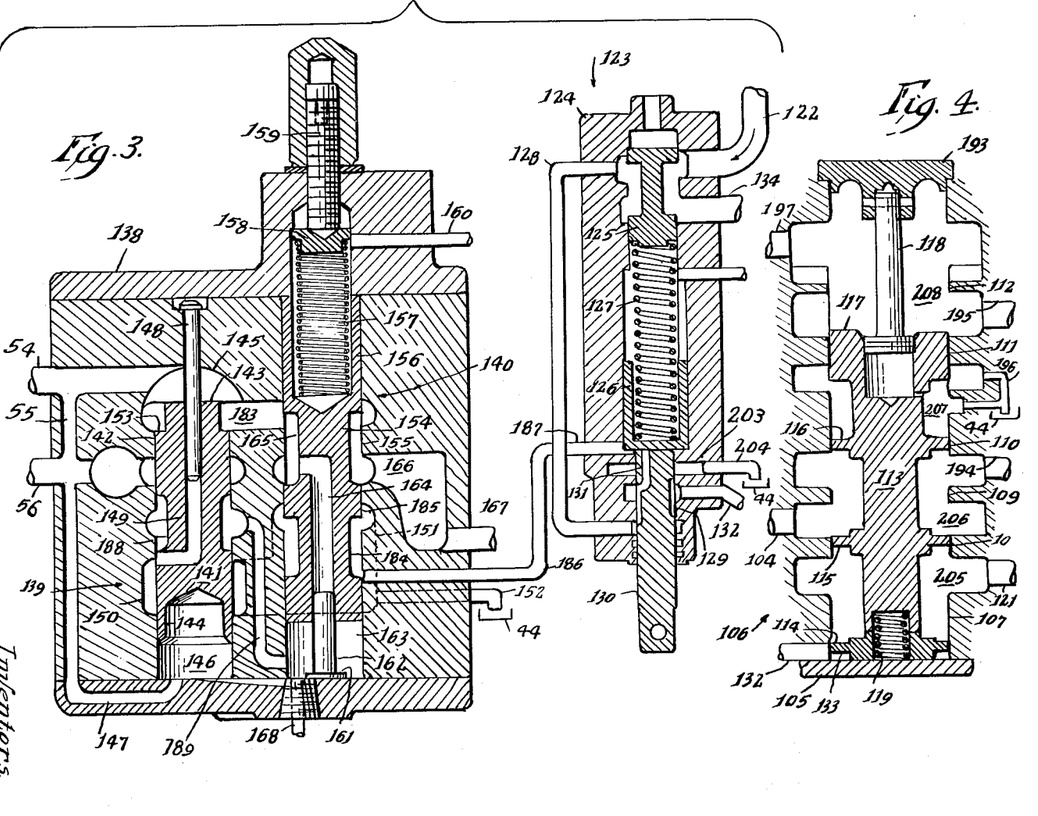
FIG. 3 is an enlarged, sectional elevation of the kickdown and clutch lockup valves and combination converter and retarder pressure control, the kickdown valve being as shown in FIG. 2, the lockup valve being in the position determining engagement of the lockup clutch for direct drive, and the converter and retarder pressure control valve being conditioned to determine the minimum pressure of the converter working liquid and selective control on the pressure outlet of the retarder.
FIG. 4 is an enlarged, sectional elevation of the retarder valve in the position determining oil flow to the retarder.
Figure 5:
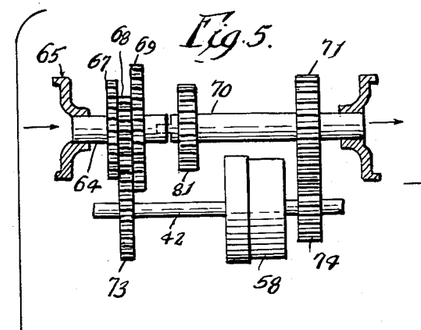
FIGS. 5 to 10, inclusive, are views schematically showing clutch and gear relations in the gear box for respectively determining first to fifth forward gears and reverse gear.
Figure 6:
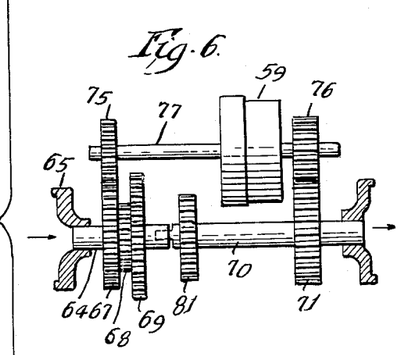
Figure 7:
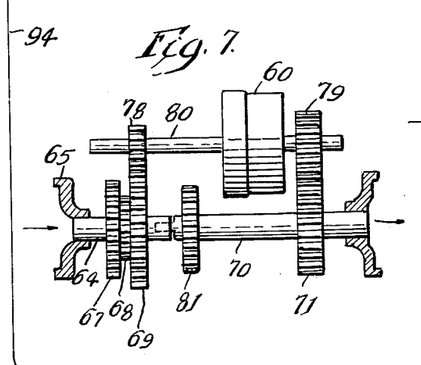
Figure 8:
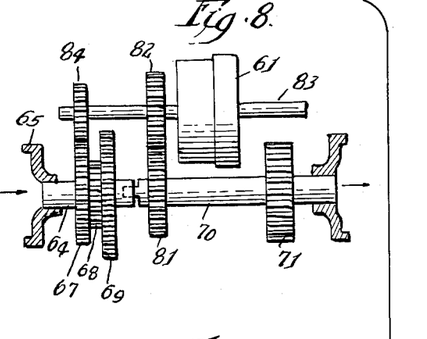
Figure 9:
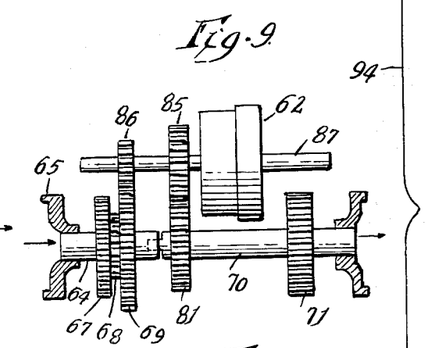
Figure 10:
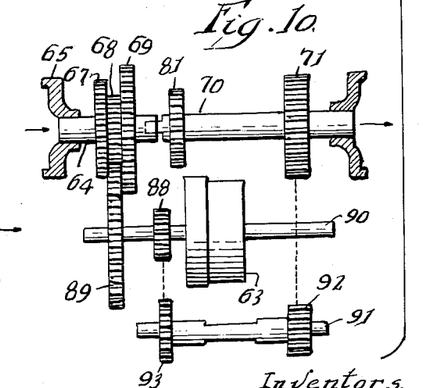

These twin loadings, under the FIG. 2 condition, bias the lockup valve piston 154 to the down position shown in the latter figure wherein this piston rests on the head 161 of a pin 162 fixedly carried by the casing 138 to provide a chamber 163 which is increased in volume when the lockup valve piston 154 is moved upwardly (see FIG. 3). The pin 162 extends within a passage 164 which extends partly longitudinally and partly laterally through the lockup valve piston 154 and always communicates with an annular passage 165 provided by adjacent shapings of the casing 138 and lockup valve piston 154. The passage 165 constantly communicates successively through a chamber 166 in the casing 138 and a pipe 167 with the passage 36 (see FIG. 1) leading to the lockup clutch cylinder 28.

For a purpose presently explained, one end of a pipe 168 connects with the chamber 163 and the opposite end is shaped to serve as a pitot tube 169 whose open end is positioned in conventional manner for subjection to the velocity pressure of a rotating oil annulus carried by an oil spinner 170 carried by a shaft 171 that is driven through a gear train 172 by the turbine shaft 17 as schematically shown in FIG. 2. The rotative speed of the spinner 170 will therefore always have some factorial relation to that of the turbine shaft 17. It will be understood that the shown drive for the spinner 170 is by way of example since it might be connected directly to the turbine shaft 17.

Figure 11:
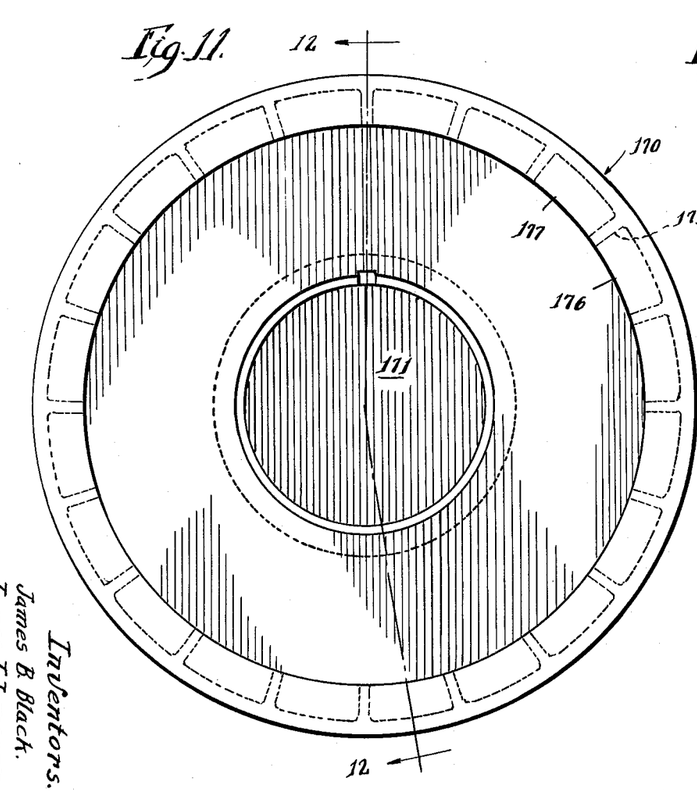
FIG. 11 is an enlarged elevation of the oil spinner as viewed in the direction of the arrow 11 in FIG. 2.
Figure 12:
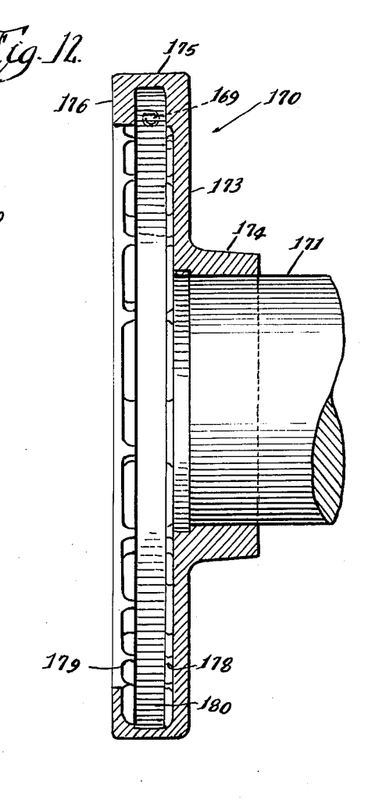
FIG. 12 is a section along the line 12—12 in FIG. 11.

Suggested structure for the oil spinner 170 is shown in FIGS. 11 and 12 to which reference will now be made. The spinner 170 includes a disk 173 having a hub 174 which is fast on the shaft 171. Integral with the outer portion of the disk 173 is a peripheral, cylindrical wall 175 from which extends inwardly an annular flange 176 having an inner edge 177 whose radius is such as to define a substantial opening facing the disk 173. The flange 176 is axially spaced from the opposite portion of the disk 173 and extending towards each other from this portion and the flange 176 are equispaced radial ribs 178 and 179, respectively. The opposed radial edges of the ribs 178 and 179 are spaced to include therebetween a free, annular pocket 180 for receiving the pitot tube 169 shown dotted in FIG. 12. Under operating conditions, a constant supply of oil is fed to the pocket 180 by a pipe 181 (see FIG. 2) which may connect with a convenient part of the hydraulic system.

It will be apparent that the rotative speed of the oil annulus trapped in the pocket 180 will vary with the speed of the turbine shaft 17 with accompanying variations in pressure transmitted through the pitot tube 169 and pipe 168 to the chamber 163 where it acts on the lower end of the lockup valve piston 154 for a purpose presently explained. The structure including the spinner 170 and pitot tube 169 will hereinafter be generally referred as the pitot governor 182.

So far as described, the operation of the transmission is as follows. With the first gear clutch 58 engaged as shown in FIG. 2, the regulating valve 48 is conditioned to establish the higher apply pressure required for the first gear clutch 58, the retarder valve stem 113 is in the up position admitting oil to the toroidal circuit 22, and the regulating valve 123 is conditioned to establish in the toroidal circuit 22 the maximum pressure required for converter drive. The kickdown valve piston 141 is in the up position shown in FIG. 2 since pressure conditions in the pipes 54 and 56 have stabilized with engagement of the first gear clutch 58. The lockup clutch valve piston 154 is in the down position shown in FIG. 2 due to the dual loading exercised by the spring 157 and the oil pressure acting through the pipe 160. In this position of the lockup clutch valve piston 154, the pipe 167 leading to the lockup clutch cylinder 28 connects successively through the chamber 166, annular passage 165, chamber 151 and passage 152 with the sump 44 so that the lockup clutch 33 stands released by the working pressure in the toroidal circuit 22. At the same time, the skirt 156 masks a passage 183 which connects with the chamber 145 and through which pressure oil is supplied to engage the lockup clutch 33 as presently described.

The only force available to move the lockup clutch valve piston 154 to the up position where it would admit engaging pressure to the lockup clutch cylinder 28 is the pressure in the pipe 168 derived from the pitot governor 182. However, due to the above noted dual loading on the lockup clutch valve piston 154, the pressure transmitted by the governor 182 is never sufficient to move the last named piston upward. Accordingly, with the gear box 94 in first gear, the transmission is restricted to drive through the converter 12 and the same condition obtains when the gear box 94 is in reverse gear.

Considering a shift in the gear box 94 from first to second gear, the selector valve 57 is moved to admit pressure to the second gear clutch 59 and to deny pressure to the first gear clutch 58 whose cylinder is dumped in the conventional manner. Therefore, pressure in the pipe 100 is interrupted and conventionally relieved through the cylinder of the first gear clutch 58 so that the piston 52 contacts the base 53. The regulating valve 48 then stablishes an engaging pressure for the second gear clutch 59 which is lower than for the first gear clutch 58 and the loading pressure on the lockup valve piston 154 is only that determined by the spring 157. During the shift from first to second gear, the kickdown valve piston 141 first moves to its down and then to its up position as explained above, but under the stated conditions, this movement does not affect the lockup valve piston 154 which is then in the down position. Further and at this time, pressure in the pipe 168 as established by the pitot governor 182 is insufficient to move the lockup valve piston 154 to the up position shown in FIG. 3, the regulating valve 123 is in the position shown in FIG. 2 which establishes maximum working oil pressure in the toroidal circuit 22 and power flow is through the converter 12, the lockup clutch 33 being released.

As the vehicle is accelerated in second gear, the oil pressure in the pipe 168 established by the pitot governor 182 increases and acts against the lower end of the lockup clutch valve piston 154. At a determined speed of the turbine shaft 17, the pressure in the pipe 168 becomes sufficient to shift the lockup clutch valve piston 154 against the spring 157 to the up position shown in FIG. 3, wherein the passage 183 registers with the annular passage 165. Engaging pressure for the lockup clutch 33 is therefore supplied through the chamber 166 and pipe 167. During this upward movement of the lockup clutch valve piston 54 and when the upper end of the annular passage 165 first uncovers the passage 183, the lockup clutch apply pressure is active successively through the annular passage 165 and passage 164 against the upper end of the fixed pin 162 and the reaction thrust of this pressure serves as an additional upward force against the lockup clutch valve piston 154. This arrangement insures fast upward movement of the lockup valve piston 154 so that apply pressure for the lockup clutch 33 is supplied without undue throttling.

In direct drive, it is desirable to reduce the oil pressure in the toroidal circuit 22 as will now be described. Referring to FIG. 3 for convenience, an annular passage 184 is formed by recessing the lockup clutch valve piston 154 below, as viewed in the last named figure, the annular passage 165, the passages 165 and 184 being separated by an annular land 185. The annular passage 184 always communicates with one end of a pipe 186 whose opposite end connects with a chamber 187 beneath the follower piston 126. In FIG. 2, the down position of the lockup clutch valve piston 154 does not affect the pressure in the chamber 187, but when the piston 154 is moved to the up position, the annular passage 184 connects with the chamber 151 and hence with the sump 44 to thereby evacuate the pressure in the chamber 187 so that the follower piston 126 moves to the position shown in FIG. 3. Regulation of the valve 125 is then determined only by the spring 127 to establish a minimum design pressure on the oil in the toroidal circuit 22. Under these conditions, direct drive is provided through the lockup clutch 33 and the stator 18 freewheels. The annular land 185 separates the lockup clutch apply pressure in the annular passage 165 from the sump pressure in the annular passage 184.

With the gear box 94 in second gear and the transmission in direct drive, if the speed of the vehicle and hence that of the turbine shaft 17 decreases to a point where the oil pressure derived from the pitot governor 182 is insufficient to maintain the lockup clutch valve piston 154 in the up position shown in FIG. 3, the piston 154 moves to the down position shown in FIG. 2. As noted above, the latter position cuts off the apply pressure to the lockup clutch 33 and connects the cylinder 28 thereof to the sump 44. Further, with the lockup clutch valve piston 154 in the down position, the connection of the chamber 187 with the sump 44 is interrupted and pressure again rises in the chamber 187 to establish the maximum design pressure in the toroidal circuit 22. The transmission is then in converter drive. Under the stated condition, disengagement of the lockup clutch 33 occurs at a lower speed of the turbine shaft 17 than the speed of this shaft which determined engagement of the same clutch.

Gear shifts above second gear are made by appropriate control of the selector valve 57 and an important feature of the invention is that when a range shift is made in the gear box 94 from a lower to a higher gear or vice versa with the transmission in direct drive, the transmission is automatically shifted from direct to converter drive. This capability enables the converter 12 to act as a shock damper during gear shifts and provides smoothness in the drive line. Return to direct drive after such a gear shift then depends upon the speed of the turbine shaft 17 and the action of the pitot governor 182 as explained above.

Since in a shift from first to second gear, the transmission is then in converter drive due to the restriction thereto in first gear, the indicated automatic characteristic just referred to may be more clearly understood by considering a shift from second to third gear.

With the second gear clutch 59 engaged and the transmission in direct drive, the kickdown valve piston 141, the lockup valve piston 154 and the follower piston 126 occupy, respectively, the positions shown in FIG. 3. When the selector valve 57 is shifted to engage the third gear clutch 60, the cylinder of the second gear clutch 59 is dumped by conventional means (not shown) and pressure oil begins flowing to the cylinder of the third gear clutch 60. Accordingly, the kickdown valve piston 141 moves to the down position by reason of the unbalancing of the forces acting thereon as explained above and wherein an annular passage 188 registers at least partly with the annular passage 150 and hence communicates through the chamber 151 and passage 152 with the sump 44. Also included in the casing 138 is a passage 189, one end of which always connects with the annular passage 188 and the other end with the chamber 163 when the lockup valve piston 154 is in the up position.

From the foregoing, it will be understood that when the kickdown valve piston 141 moves to the down position, the pressure in the chamber 163 is discharged through the passage 189 to the sump 44 so that the lockup valve piston 154 is also moved to the down position as shown in FIG. 2 by the spring 157. Accordingly, the lockup clutch 33 is released and the maximum design pressure is reestablished in the toroidal circuit 22 and the transmission is then in converter drive. As soon as the pressure is stabilized on opposite ends of the kickdown valve piston 141, the latter returns to the up position and it and the lockup valve piston 154 occupy the positions shown in FIG. 2. In the down position of the lockup valve piston 154, it masks the adjacent end of the passage 189 so that as the speed of the turbine shaft 17 increases, pressure in the chamber 163 may build up to the value which determines an upward movement of the lockup valve piston 154 and an automatic resumption of direct drive. It will be apparent that like operation will occur during gear box shifts and after in the higher ranges in the gear box 94.

The vehicle may be braked during converter or direct drive by the usual wheel brakes, or the retarder 37, or by both of these devices. The braking capacity of the retarder 37 is inherently variable with vehicle speed and control means are provided for varying its braking capacity at any given speed. The retarder 37 and the retarder valve 106 are connected in the hydraulic system by the following instrumentalities.

In the converter drive position of the retarder valve 106, i.e., with the valve stem 113 in the up position shown in FIG. 2, annular chambers 190 and 191 are respectively included between the stem 113, the lands 115 and 116 and the shoulders 109 and 110, and the stem 113, lands 116 and 117 and the shoulders 110, 111 and 12. An annular chamber 192 is also included between the stop pin 118, the land 117, shoulder 112 and a cover 193 which carries the stop pin 118. A pipe 194 connects the chamber 190 with the retarder chamber 40 and a pipe 195 connects the retarder discharge outlet 43 with the chamber 191. The chambers 190 and 191 connect through a manifold pipe 196 with the sump 44 so that any oil in the retarder 37 from a previous braking operation is discharged to the sump 44.

For purposes presently explained, pipes 197 and 198 connect the converter discharge pipe 122 respectively with the chamber 192 above the stem 113 and with the pipe 102 leading to the cooler 103, the pipe 198 including a suitably driven, circulating pump 199. A pipe 200 connects the converter discharge pipe 122 with the pipe 198 on the discharge side of the pump 199 and included in the pipe 200 is a conventional check valve 201 and positioned in the pipe 200 in bypass relation to the check valve 201 is a relief valve 202, the valves 201 and 202 being employed for purposes presently explained.

The braking action will be initially described with the transmission in converter drive and the several parts in the relative positions shown in FIG. 2, and particularly, the retarder 37 free of oil. Since the retarder 37 is driven from the turbine shaft 17 which is then rotating, braking restraint only requires an oil supply to the retarder chamber 40.

The stem 130 is moved upwardly, as viewed in FIG. 2, to connect the chamber 187 through the passage 131 and an annular chamber 203 with a pipe 204 leading to the sump 44, thus exhausing the pressure in the chamber 187 and enabling the spring 127 to move the follower piston 126 into contact with the upper end of the stem 130. It will be apparent that pressure in the pipe 122 may now be regulated by load changes on the spring 127 occasioned by selected positionings of the stem 130.

When the pressure is released in the chamber 187, pressure in the chamber 133 is simultaneously released to the sump 44 successively through the pipe 132, annular channel 129, annular chamber 203 and pipe 204. The converter discharge pressure acting through the pipe 197 now acts against the upper end of the retarder valve stem 113 and shifts the same to the down position shown in FIG. 4. This new position of the stem 113 establishes a new group of chambers in the valve 106, some of which include parts of the earlier identified chambers, but considered with respect to the systemic operation are functionally different as will be apparent by comparing FIGS. 2 and 4. The sole exception is the chamber 133 which merely decreases in volume.

The new chambers are identified by the numerals 205, 206, 207 and 208. Chamber 205 connects with the pipe 121 leading to the converter 12 and is included between the stem 113, lands 114 and 115 and the shoulders 107 and 108. Chamber 206 provides a connection between the pipe 104 which receives oil from the oil cooler 103 (see FIG. 2) and the pipe 194 leading to the retarder chamber 40 (see FIG. 2) and is included between the stem 113, lands 115 and 116 and the shoulders 108, 109 and 110. Chamber 207 connects with the manifold 196 and is included between the stem 113, lands 116 and 17 and the shoulders 110 and 111. Chamber 208 provides communication between the pipe 197 which connects with the discharge pipe 122 and the pipe 195 which connects with the retarder outlet 43 and is included between the stop pin 118, land 117, cover 193 and the shoulders 111 and 112.

From the foregoing, it will be apparent that oil flow is now denied to the pipe 121 leading to the converter 12, and oil flow is established from the cooler 103 through the chamber 206 and pipe 194 to the the retarder chamber 40 and thence through the pipe 195, chamber 208 and pipe 197 to the converter discharge pipe 122. This established oil flow bypasses the converter 12, but the latter remains filled with oil, and the pressure in the chamber 208 occasioned by the pumping action of the retarder 37 maintains the retarder valve stem 113 in the down position shown in FIG. 4. Further, it will be understood that since, under braking conditions as noted above, the stem 130 can control the pressure in the pipe 122, the same control exists with reference to pressure in the pipe 197 and hence pressure at the outlet 43 of the retarder 37. Due to the characteristics of the retarder 37, control on the outlet pressure of the retarder 37 provides control on the braking action.

During converter drive, there is normally a higher pressure in the oil cooler 103 and the pipe 121 leading to the converter 12 than in the discharge pipe 122 so the provision of the circulating pump 199 establishes additional flow through the cooler 103 over that supplied by the pump 45 for adequate cooling. When the retarder 37 is functioning, the pumping effect thereof establishes a pressure in the pipes 195, 197 and 122 that is higer than the pressure in the retarder supply pipe 194. The check valve 201 insures full employment of this pressure differential to increase the oil flow to the cooler 103 above that supplied by the pumps 45 and 199 and this added cooling flow occurs at a time when most needed. The relief valve 202 opens in the event of a cold oil condition in the converter or retarder system.

When braking is no longer required, the stem 130 is returned to the position shown in FIG. 2 whereupon the retarder valve stem 113 resumes the up position shown in the same figure. Converter drive is reestablished and the oil in the retarder 37 is exhausted to the sump 44.

If the transmission is in direct drive when it is desired to brake, the kickdown and lockup valves 139 and 140, respectively, and the stem 130 are then in the positions shown in FIG. 3, and the retarder valve stem 113 is in the position shown in FIG. 2. The follower piston 126 is in contact with the stem 130 because the chamber 187 then connects with the sump 44 through the pipe 186 and allied channels and chambers as explained above. When the stem 130 is moved upwardly to raise the pressure in the pipe 122, the chamber 133 beneath the stem 113 connects with the sump 44 through the pipe 132, annular channel 129, annular chamber 203 and pipe 204. The stem 113 accordingly shifts to the down position shown in FIG. 4 and the retarder 37 begins operating all as described above. Depending upon conditions, retarder braking which is first applied when the transmission is in direct drive may continue long enough to drop the speed of the turbine shaft 17 sufficiently to condition the transmission for immediate resumption in converter drive whenever the retarder 37 goes out of action.

The braking capacity of the retarder 37 is proportional to the fill of the chamber 40 and this capacity is regulated by controlling the pressure at the retarder outlet 43 and hence the fill of the chamber 40.

We claim:

1. In a power transmission including an hydraulic torque converter having an impeller arranged for connection to a power source, a turbine and a stator cooperably related to form a toroidal circuit, a shaft connected to the turbine, an hydraulically actuated, friction plate, lockup clutch engageable to connect the impeller and turbine to provide direct drive to the turbine shaft, a plurality of constant mesh, gear trains having respectively different gear ratios and connection with the turbine shaft and a load shaft, and a plurality of hydraulically actuated, friction plate clutches associated with the gear trains, the combination of an hydraulic system including a pressure liquid source, the toroidal circuit, lockup and gear train clutches, a selector valve movable to connect the pressure liquid source with a selected gear train clutch, means shiftable between positions disconnecting and connecting the pressure liquid source from and to the lockup clutch to provide converter and direct drive through the transmission, respectively, comprising a lockup valve, spring means acting against one end of and biasing the lockup valve to the position disconnecting the pressure liquid source from the lockup clutch at one determined speed of the turbine shaft, liquid pressure generating means whose presssure output is responsive to turbine shaft speed, and an uncontrolled passage connecting with the output of the liquid pressure generating means for supplying pressure to the opposite end of the lockup valve to move the same to the position connecting the pressure liquid source to the lockup clutch at a higher turbine shaft speed.

2. In a power transmission including an hydraulic torque converter having an impeller arranged for connection to a power source, a turbine and a stator cooperably related to form a toroidal circuit, a shaft connected to the turbine, an hydraulically actuated, friction plate, lockup clutch engageable to connect the impeller and turbine to provide direct drive to the turbine shaft, a plurality of constant mesh, gear trains having respectively different gear ratios and connection with the turbine shaft and a load shaft, and a plurality of hydraulically actuated, friction plate clutches associated with the gear trains, the combination of an hydraulic system including a pressure liquid source, the toroidal circuit, lockup and gear train clutches, a selector valve movable to connect the pressure liquid source with a selected gear train clutch, means shiftable between positions disconnecting and connecting the pressure liquid source from and to the lockup clutch to provide converter and direct drive through the transmission, respectively, liquid pressure generating means whose pressure output is responsive to turbine shaft speed for supplying pressure to the shiftable means to move the same to connecting position, means associated with the shiftable means and connectible with the pressure liquid source to provide an additional pressure for moving the shiftable means to connecting position to prevent throttling of the pressure liquid supplied to the lockup clutch, and means for moving the shiftable means from the connecting position to the disconnecting position to thereby condition the transmission for converter drive when the selector valve is moved to disengage one gear train clutch and to engage another gear train clutch.

3. A combination as defined in claim 2 wherein the shiftable means includes a kickdown valve responsive to the disengagement of one gear train clutch and the engagement of another gear train clutch and a lockup valve biased to said disconnecting position, liquid pressure generating means whose pressure output is responsive to turbine shaft speed for supplying pressure to the lockup valve to move the same to connecting position, means associated with the lockup valve and connectible with the pressure liquid source to provide an additional pressure for moving the lockup valve to connecting position to prevent throttling of the pressure liquid supplied to the lockup clutch, conduit means connecting opposite ends of the kickdown valve with the liquid pressure source and the selector valve, respectively, and including an orifice passage, the kickdown valve being pressure held in one position after a selected gear train clutch is engaged and the lockup valve is in said connecting position, and the kickdown valve being unbalanced by a pressure differential due to pressure liquid flow through the orifice passage for movement to a position determining movement of the lockup valve to said disconnecting position when a change in gear train clutches is made.

4. A combination as defined in claim 3 wherein the lockup valve includes first passage means providing communication between the pressure liquid source and the lockup clutch when the lockup valve moves toward said connecting position, a second passage means communicating with the first passage means, and a fixed pin positioned in the second passage means and against which the pressure liquid reacts to provide an additional pressure moving the lockup valve to connecting position.

5. In a power transmission including an hydraulic torque converter having an impeller arranged for connection to a power source, a turbine and a stator cooperably related to form a toroidal circuit, a shaft connected to the turbine, an hydraulically actuated, friction plate, lockup clutch engageable to connect the impeller and turbine to provide direct drive to the turbine shaft, a plurality of constant mesh, gear trains having respectively different gear ratios and connection with the turbine shaft and a load shaft and including first and reverse gears, and a plurality of hydraulically actuated, friction plate clutches associated with the gear trains, the combination of an hydraulic system including a pressure liquid source, the toroidal circuit, lockup and gear train clutches, a lockup valve biased to a position disconnecting the pressure liquid source from the lockup clutch, liquid pressure generating means whose pressure output is responsive to turbine shaft speed for supplying pressure to the lockup valve to move the same to a position connecting the pressure liquid source with the lockup clutch, a selector valve movable to connect the pressure liquid source with a selected gear train clutch, pressure regulating valve means for determining a relatively low engaging pressure for the gear train clutches except the first and reverse gear clutches, means for conditioning the pressure regulating valve means to determine a higher engaging pressure for the first and reverse gear clutches as selected, and means for denying connection of the pressure source with the lockup clutch when as selected the first gear and the reverse gear clutch is engaged to thereby condition the transmission for drive through the converter, and means associated with the lockup valve and connectible with the pressure liquid source to provide an additional pressure for moving the lockup valve to connecting position to prevent throttling of the pressure liquid supplied to the lockup clutch.

6. In a power transmission including an hydraulic torque converter having an impeller arranged for connection to a power source, a turbine and a stator cooperably related to form a toroidal circuit, a shaft connected to the turbine, and an hydraulic retarder comprising a stationary chamber having oppositely facing, bladed stators, a discharge outlet, and a bladed rotor positioned between the stators and connected to the turbine shaft, the combination of an hydraulic system including a pressure liquid source, the toroidal circuit, the retarder chamber, a retarder valve movable between positions respectively connecting the pressure liquid source with the retarder chamber and the toroidal circuit, and means for controlling the pressure at the retarder discharge outlet to regulate the braking action of the retarder when pressure liquid is supplied thereto.

7. A combination as defined in claim 6 wherein a pressure regulating valve is provided for selectively determining the pressure in the toroidal circuit and the retarder chamber outlet depending upon the position of the retarder valve, means for triggering the retarder valve from one of its positions to the other, and means for conditioning the pressure regulating valve to vary the pressure in the tarder chamber outlet when the retarder valve is in retarder chamber connecting position.

References Cited by the Examiner

UNITED STATES PATENTS

| | | |
|---|---|---|
| 2,978,928 | 4/1961 | Tuck et al. |
| 3,138,969 | 6/1964 | Fisher et al. |

DAVID J. WILLIAMOWSKY, *Primary Examiner.*

DON A. WAITE, *Examiner.*

H. S. LAYTON, *Assistant Examiner.*